US009597995B1

(12) United States Patent
Weltikol et al.

(10) Patent No.: US 9,597,995 B1
(45) Date of Patent: Mar. 21, 2017

(54) FOLDING, STORING TONNEAU COVER

(71) Applicants: Retrax Holdings, LLC, Grand Forks, ND (US); Extang Corporation, Ann Arbor, MI (US)

(72) Inventors: Brandon Scott Weltikol, Grand Forks, ND (US); Tim Adam, Thompson, ND (US); Ryan W. Delong, Stockbridge, MI (US)

(73) Assignees: Retrax Holdings, LLC, Grand Forks, ND (US); Extang Corporation, Ann Arbor, MI (US)

( * ) Notice: Subject to any disclaimer, the term of this patent is extended or adjusted under 35 U.S.C. 154(b) by 0 days.

(21) Appl. No.: 15/054,795

(22) Filed: Feb. 26, 2016

(51) Int. Cl.
*B60P 7/02* (2006.01)
*B60L 7/14* (2006.01)
*B60P 7/08* (2006.01)
*B60J 7/14* (2006.01)

(52) U.S. Cl.
CPC ............... *B60P 7/02* (2013.01); *B60J 7/141* (2013.01); *B60P 7/0815* (2013.01)

(58) Field of Classification Search
CPC ......... B60P 7/02; B60P 7/0815; B60R 5/045; B60R 5/047; B60R 5/048; B60R 9/06; B60J 7/102; B60J 7/106; B60J 7/108; B60J 7/141
USPC ............ 296/100.02, 100.03, 100.06, 100.09
See application file for complete search history.

(56) References Cited

U.S. PATENT DOCUMENTS

| 4,776,629 | A | * | 10/1988 | Cross | B60J 7/041 160/32 |
|---|---|---|---|---|---|
| 5,823,605 | A | * | 10/1998 | Seargeant | B60J 7/041 160/201 |
| 5,961,173 | A | * | 10/1999 | Repetti | B60J 7/141 296/100.01 |
| 6,899,372 | B1 | * | 5/2005 | Keller | B60J 7/141 296/100.06 |
| 7,195,299 | B2 | * | 3/2007 | Steffens | B60R 9/00 224/404 |
| 8,087,713 | B2 | | 1/2012 | Schrader et al. | |
| 8,474,896 | B2 | * | 7/2013 | Ostberg | B60J 5/14 296/100.02 |
| 8,690,224 | B2 | | 4/2014 | Maimin et al. | |
| 9,249,610 | B2 | * | 2/2016 | Reus | E04H 4/082 |
| 2007/0210609 | A1 | * | 9/2007 | Maimin | B60P 7/02 296/100.09 |
| 2009/0236870 | A1 | | 9/2009 | Duncan | |
| 2013/0229027 | A1 | | 9/2013 | Copp et al. | |
| 2014/0152046 | A1 | * | 6/2014 | Facchinello | B60J 7/141 296/100.06 |

(Continued)

*Primary Examiner* — Gregory Blankenship
(74) *Attorney, Agent, or Firm* — Harness, Dickey & Pierce, PLC

(57) ABSTRACT

A cover includes multiple panels pivotally connected together and foldable between a stacked arrangement and a deployed arrangement. Side rails are attachable to opposite sides of the cargo box and include ledges. Storage extension guides intersects the ledges. The panels are supportable upon the ledges in the deployed arrangement to cover the cargo box. The stack is supportable upon the first and second ledges in an intermediate position adjacent the storage extension guides. The stack is movable along the guides between the intermediate position and a storage position in which the forward edge of the lowermost panel is oriented below the rear edge of the lowermost panel.

24 Claims, 15 Drawing Sheets

(56) References Cited

U.S. PATENT DOCUMENTS

| | | | |
|---|---|---|---|
| 2015/0197290 A1* | 7/2015 | Chapman | B60R 9/06 |
| | | | 296/100.08 |
| 2016/0031302 A1* | 2/2016 | Nania | B60P 7/02 |
| | | | 296/100.09 |
| 2016/0200376 A1* | 7/2016 | Kerr, III | B60P 7/02 |
| | | | 296/100.07 |

* cited by examiner

FOLDING, STORING TONNEAU COVER

FIELD

The present disclosure relates to tonneau covers and, more particularly, relates to folding tonneau covers that can be stored below in a vertical position within the cargo box area of a truck.

BACKGROUND

This section provides background information related to the present disclosure which is not necessarily prior art.

Trucks such as pickups and trucks having a cargo box can be a quite popular type of vehicle because the cargo box enables objects of various sizes to be placed therein and transported. The cargo box pickup generally has a floor surface or bed that is bounded by a forward wall, opposing side walls and a tailgate providing a rearward wall.

Covers can be used to enclose the cargo box to protect the contents against dirt, debris, and other environmental contaminants, and to improve the aesthetic quality thereof. In some cases, the covers can be formed of generally planar sections or panels hingedly coupled together so they can be folded together in a stacked arrangement to allow access to the cargo box. The stacked panels typically still leave a portion of the cargo box covered. In some cases the stacked panels can be rotated so the tonneau cover extends upwardly above the truck box and rests against or generally adjacent the rear window of the passenger compartment of the pickup. Although this can reduce the portion of the cargo box affected by the stacked panels, this upwardly extending orientation can result in the tonneau cover partially or completely obscuring the view out the rear window.

Therefore, there exists a need to provide a foldable tonneau cover that is capable of providing sufficient protection to the bed and/or its contents. Moreover, there exists a need to provide a hard tonneau cover that is more easily configured into a stowed position so that the folded, stacked panels do not obscure sightlines through the rear window or unnecessarily obscure access to the truck box.

SUMMARY

This section provides a general summary of the disclosure, and is not a comprehensive disclosure of its full scope or all of its features.

In accordance with an aspect of the present disclosure, a tonneau cover system for a cargo box of a truck includes a cover comprising a plurality of panels pivotally connected together. The panels are foldable between a stacked arrangement wherein the panels are folded onto a lowermost panel to form a stack and a deployed arrangement wherein the panels are extended over the cargo box with the lowermost panel having a forward edge and a rear edge. A first side rail is attachable to a first side of the cargo box and comprises a first ledge and a second side rail is attachable to a second side of the cargo box and comprises a second ledge. A first storage extension guide intersects the first ledge, and a second storage extension guide intersects the second ledge. The panels are supportable upon the first and second ledges in the deployed arrangement for covering the cargo box. The stack is supportable upon the first and second ledges in an intermediate position with the forward edge of the lowermost panel adjacent the first and second guides. The stack is movable along the first and second guides between the intermediate position and a storage position in which the forward edge of the lowermost panel is oriented below the rear edge of the lowermost panel.

In accordance with another aspect of the present disclosure, a tonneau cover system for a cargo box of a truck includes a cover comprising a plurality of panels pivotally connected together. The plurality of panels comprise a forward panel having a forward edge and a rear edge. The panels are foldable between a deployed arrangement wherein the panels are deployed with the forward panel in a forward position, and a stacked arrangement wherein the panels are folded onto the forward panel to form a stack. A first side rail is attachable to a first side of the cargo box and comprises a first ledge, and a second side rail is attachable to a second side of the cargo box and comprises a second ledge. A first storage extension guide intersects the first ledge, and a second storage extension guide intersects the second ledge. A first wheel is affixed to the forward panel and extends therefrom for rolling the stack along the first guide, and a second wheel is affixed to the forward panel and extends therefrom for rolling the stack along the second guide. The panels in the deployed arrangement are supportable upon the first and second ledges for covering the cargo box. The stack is rollable via the wheels along the first and second ledges to an intermediate position in which the forward edge of the forward panel is adjacent the first and second guides. And the stack is rollable via the wheels along the first and second guides between the intermediate position and a storage position in which the forward edge of the forward panel is oriented below the rear edge of the forward panel.

In accordance with a further aspect of the present disclosure, a tonneau cover system for a cargo box of a truck includes a cover comprising a plurality of panels pivotally connected together. The plurality of panels comprise a forward panel having a forward edge and a rear edge. The panels are foldable between a deployed arrangement wherein the panels are deployed with the forward panel in a forward position, and a stacked arrangement wherein the panels are folded onto the forward panel to form a stack. A separate cover is hingedly mountable relative to the cargo box to cover a portion of the cargo box forward of the forward edge of the forward panel in the deployed arrangement. A first side rail is attachable to a first side of the cargo box and comprises a first ledge and a second side rail is attachable to a second side of the cargo box and comprises a second ledge. A first storage extension guide intersects the first ledge, and a second storage extension guide intersects the second ledge. The panels in the deployed arrangement are supportable upon the first and second ledges for covering the cargo box. The stack is supportable upon the first and second ledges in an intermediate position in which the forward edge of the forward panel is adjacent the first and second guides. The stack is slidable along the first and second guides between the intermediate position and a storage position in which the forward edge of the forward panel is oriented below the rear edge of the forward panel. The second cover is pivotable between an open position allowing the stack to move along the first and second storage extension guides between the intermediate position and the storage position, and a closed position in which the second cover extends over the stack when the stack is in the storage position.

Further aspects and areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
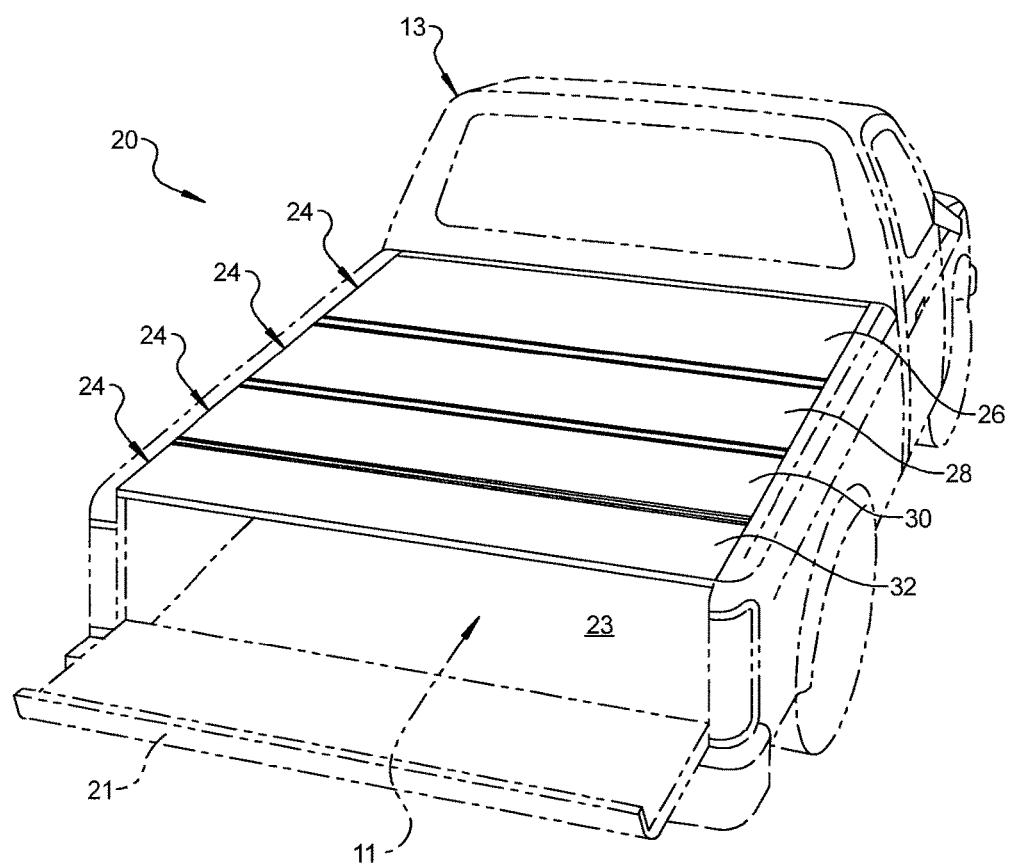
FIG. 1 is a perspective view illustrating a foldable tonneau cover in accordance with the present disclosure in an extended or unfolded arrangement covering a cargo box of a pickup truck.
Figure 2:
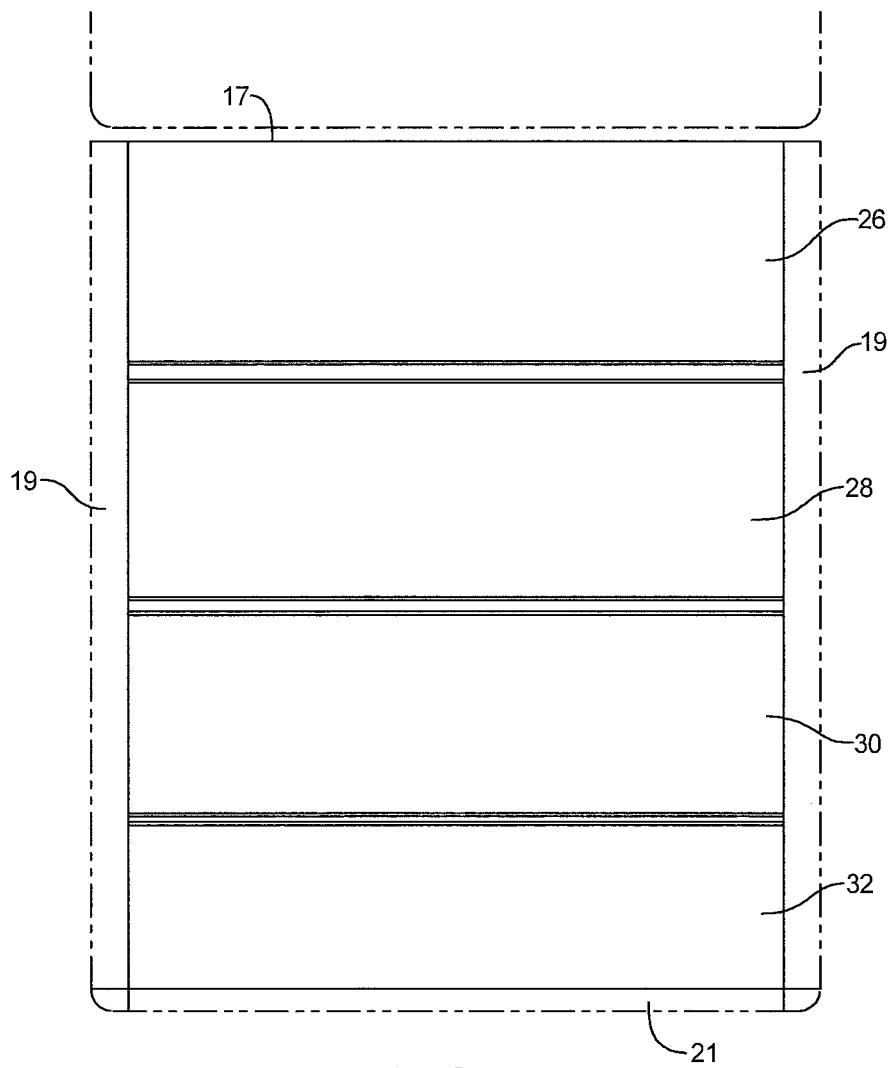
FIG. 2 is a top plan view of the cover of FIG. 1.
Figure 3:
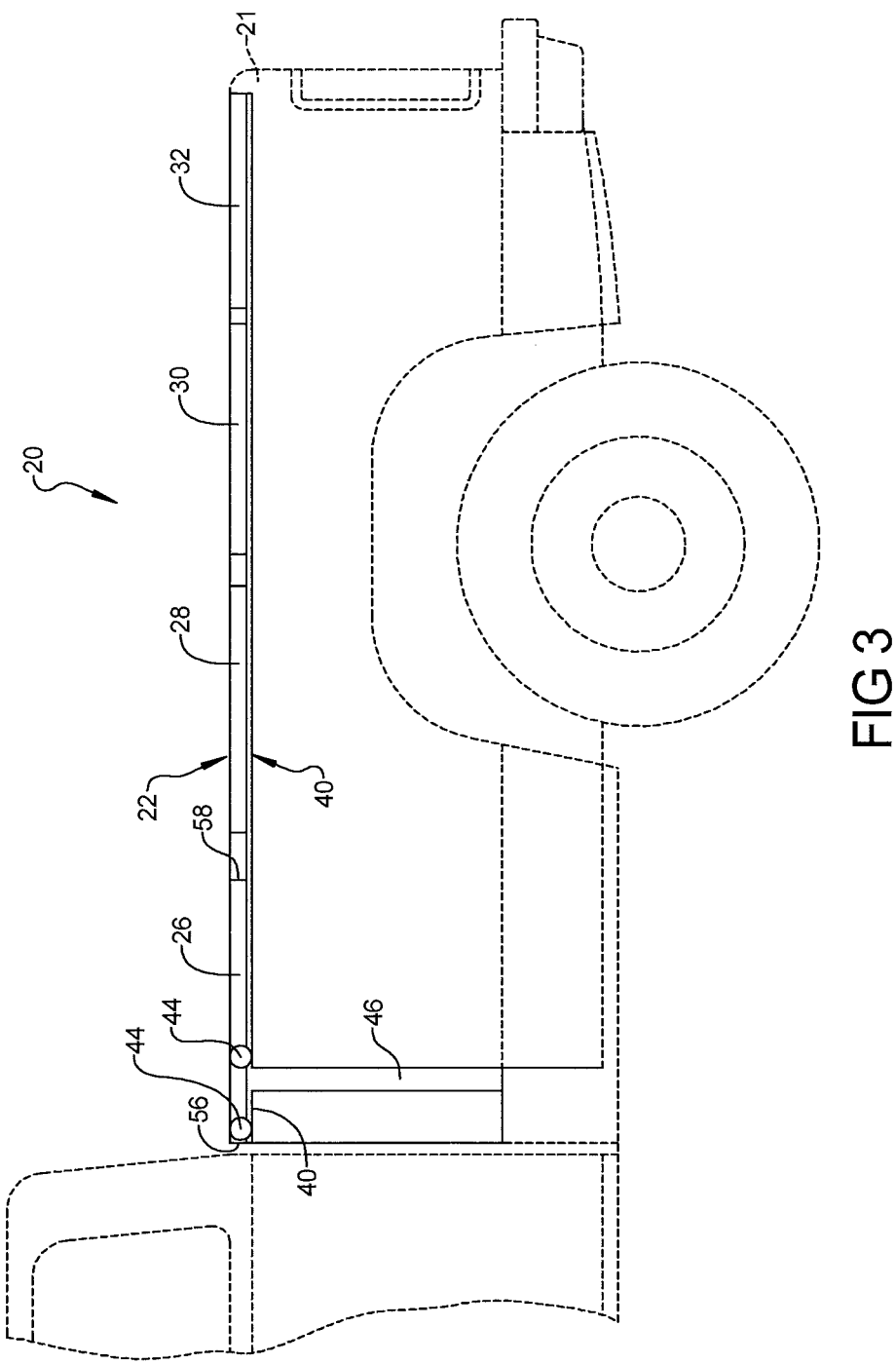
FIG. 3 is a side elevation view of a first exemplary embodiment of a foldable tonneau cover for a truck bed in an extended or unfolded or deployed arrangement covering a cargo box of a pickup truck.

Example embodiments will now be described more fully with reference to the accompanying drawings.

Referring to FIGS. 1-16, various example embodiments of a tonneau cover system 20 for covering a truck bed or cargo box 11 is provided. In some cases, the truck bed or cargo box 11 can be part of a pickup truck 13 as shown. Briefly, cargo box 11 can comprise a plurality of sidewalls, namely a lateral or transverse front wall 17, a pair of opposing longitudinal sidewalls 19, and a lateral or transverse rear wall or tailgate 21. These walls can extend vertically from a generally planar bottom surface 23. Traditionally, walls 17, 19, 21 generally extend to a common height above bottom surface 23, to provide the cargo box with a substantially uniform depth.

In some embodiments, the tonneau cover 22 of the tonneau cover system 20 can include a plurality of panels 24 including a forward panel 26. A remainder of the plurality of panels can include a second panel 28, a third panel 30, and a rearward panel 32. The plurality of panels 24 can be hingedly coupled together to be foldable between a deployed or extended arrangement covering the cargo box 11 (e.g., FIGS. 1-3, 11 and 14) and a folded or stacked arrangement wherein the panels 22 are stacked upon and overlie the forward panel 24 (e.g., FIGS. 7, 12, and 16).

In some embodiments, the panels 24 of the tonneau cover 22 can comprise a central rigid panel 34. In other embodiments, the panels 24 can comprise a flexible sheet material spanning a frame. In some cases, the tonneau cover 22 can include at least four panels 24. In some embodiments, the plurality of panels 24 can be interlockingly coupled to adjacent panels 24 to provide a pivotable or hinged connection therebetween.

When the tonneau cover 22 is in the deployed or extended arrangement (e.g., FIGS. 1-3, 11 and 14), the bottom face 38 of each panel section can be positioned to face toward the bottom surface 23 of the cargo box 11, with the top face 36 opposite the bottom face 38 and facing upwardly or away from the bottom surface 23. In this deployed or extended arrangement, the primary panel plane of each of the plurality panels can all be substantially coplanar with each other and with a first plane, which first plane can be substantially horizontal in the deployed arrangement.

Referring to the embodiment of FIGS. 3-10, in some embodiments first and second or left and right side rails 40 can be coupled to the opposite lateral side walls, or longitudinally extending walls 19, respectively, of the truck box 11. Each of the side rails 40 can include a ledge 42. Wheels 44 can extend from the opposite lateral sides of at least one of the panels 24. As illustrated in this embodiment, in some cases multiple wheels 44 can extend from each of the opposite lateral sides of the panel 24. In other embodiments, a single wheel 44 can extend from each of these opposite lateral sides. The panels 24 in the deployed arrangement can be supported upon the ledges 42. For example, any panel 24 without wheels 44 can be supported directly upon the ledges 42, and any panel 24 with wheels 44 can be supported via the wheels 44 upon the ledges 42.

First and second or left and right extension guides 46 can also be coupled to the opposite lateral side walls, or longitudinally extending walls 19, respectively, of the truck box 11 to intersect with the respective ledges 42 of the side rails 40. In some cases, the side rails 40, or some portion thereof, and the guides 46 can be formed as a single piece. In some cases, the side rails 40 and the guides 46 can be formed from multiple separate parts that can be coupled together. The storage extension guides 46 can extend substantially orthogonal to the ledges 42.

Figure 4:
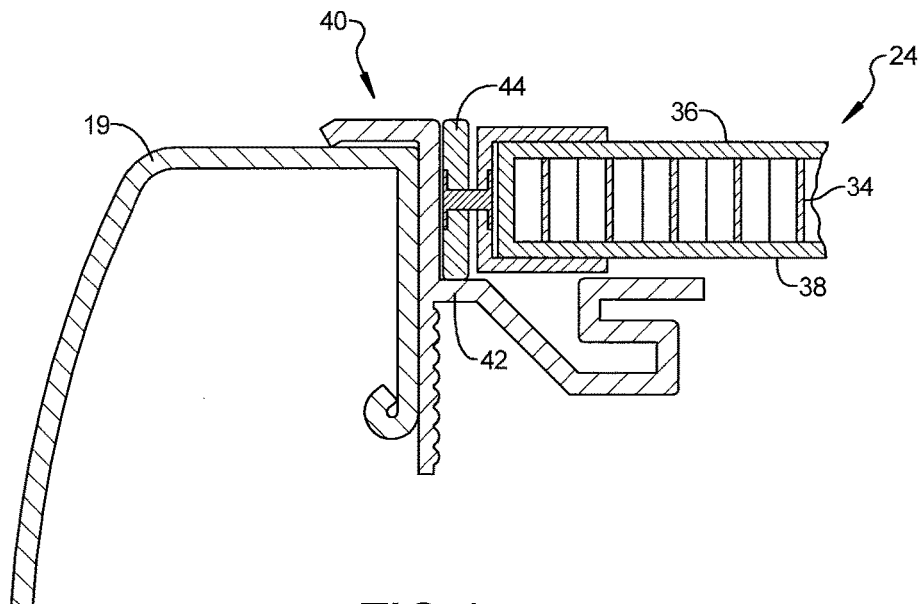
FIG. 4 is a partial cross-section view of an edge of the tonneau cover, a first portion of a side rail, and a side wall of a pick-up truck box.
Figure 5:
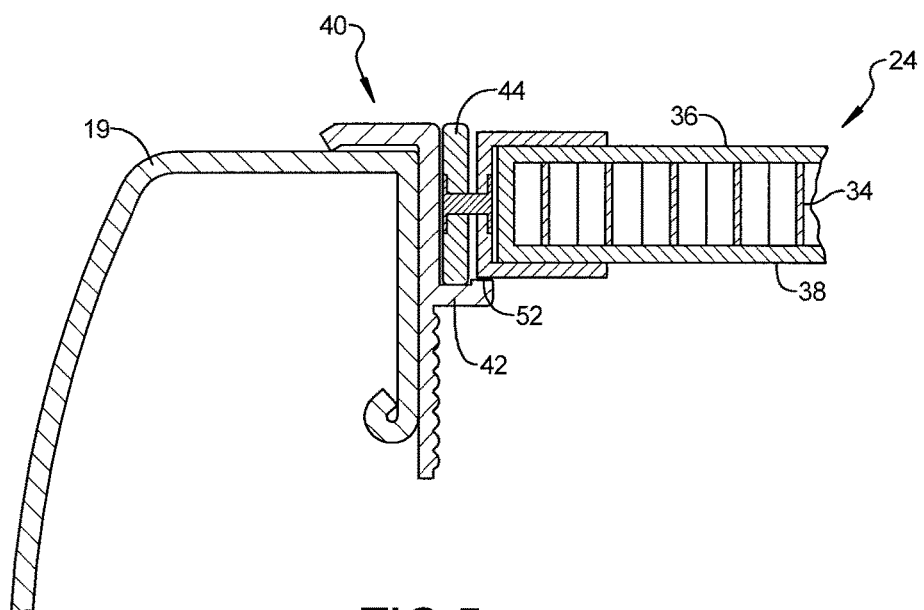
FIG. 5 is a partial cross-section view similar to FIG. 6, but with a second portion of the side rail.
Figure 6:
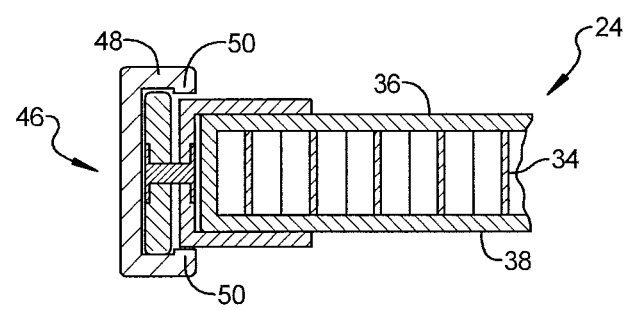
FIG. 6 is a partial cross section view of an edge of the tonneau cover and a storage extension guide.

As illustrated in FIGS. 4-6, in some embodiments the storage extension guides can comprise tracks 48 that can have a width that is greater than the diameter of the wheels 44, and can include one or more lips 50 to retain the wheels in the tracks 48. Similarly, the side rails 40 can include lips 52. Also, different portions or lengths of the side rails 40 can have different cross-sectional shapes. For example, the cross-sectional shape of the side rail 40 illustrated in FIG. 4 can be used for a portion of the side rails 40 to the rear of the storage extension guides 46, and the cross-sectional shape of the side rail 40 illustrated in FIG. 5 can be used for a portion of the side rails 40 forward of the storage extension guides 46.

As illustrated in FIGS. 7-10, in some embodiments the wheels 44 can be located on the forward panel 26, and can be positioned forward of the extension guides 46, to the rear of the extension guides 46, or both. The tonneau cover 22 can be folded from the deployed arrangement of FIG. 3 into the stacked arrangement of FIG. 7. For example, the rear panel 32 can be pivoted 180 degrees and folded so the top face 36 of the rear panel 32 can be positioned to oppose or face toward the adjacent top face 36 of the third panel 30. This pair of folded panels 32, 30 can then be pivoted 180 degrees and folded onto the second panel 28. This three panel group of folded panels 32, 30, 28 can then be pivoted 180 degrees and folded onto the forward panel 28 to form a completely folded stack 54. Thus, in some embodiments, the lowermost panel in the stack 54 can be the forward panel 26.

Figure 7:
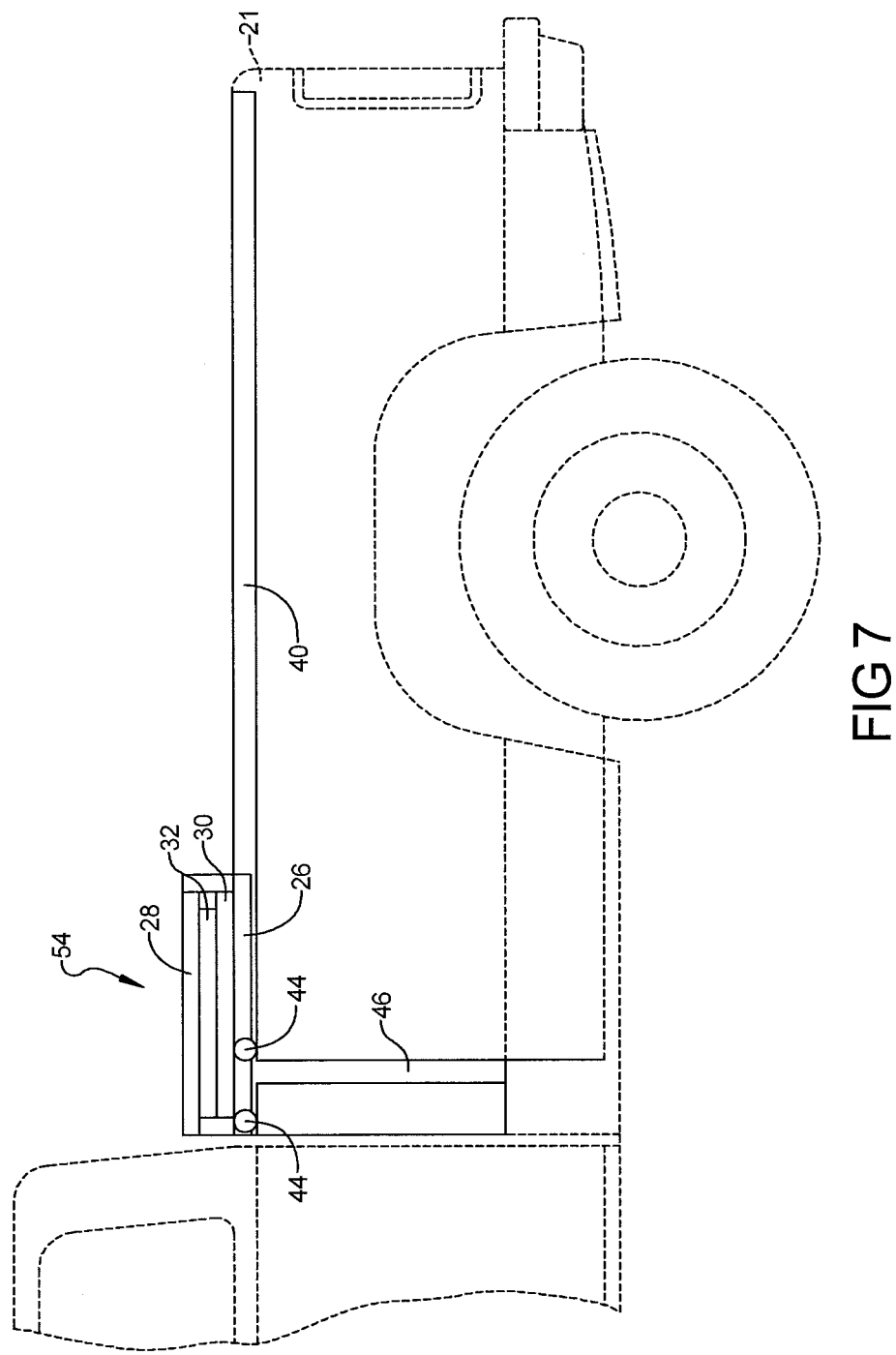
FIG. 7 is a side elevation view of the foldable tonneau cover of FIG. 3 in a stacked arrangement at an initial stack position.

FIG. 7 illustrates the stack 54 in the initial stack position (i.e., the initial position where the formation of the stack is completed) of this embodiment. This initial stack position, can also be referred to as the pre-deploy position, since it can also be the position from which the panels are unfolded into the deployed arrangement. The side rails 40 can be mountable to the cargo box 11 to support the stack 54 on the ledges 42 so that the stack 54 extends above the cargo box 11 in the stacked arrangement.

Figure 8:
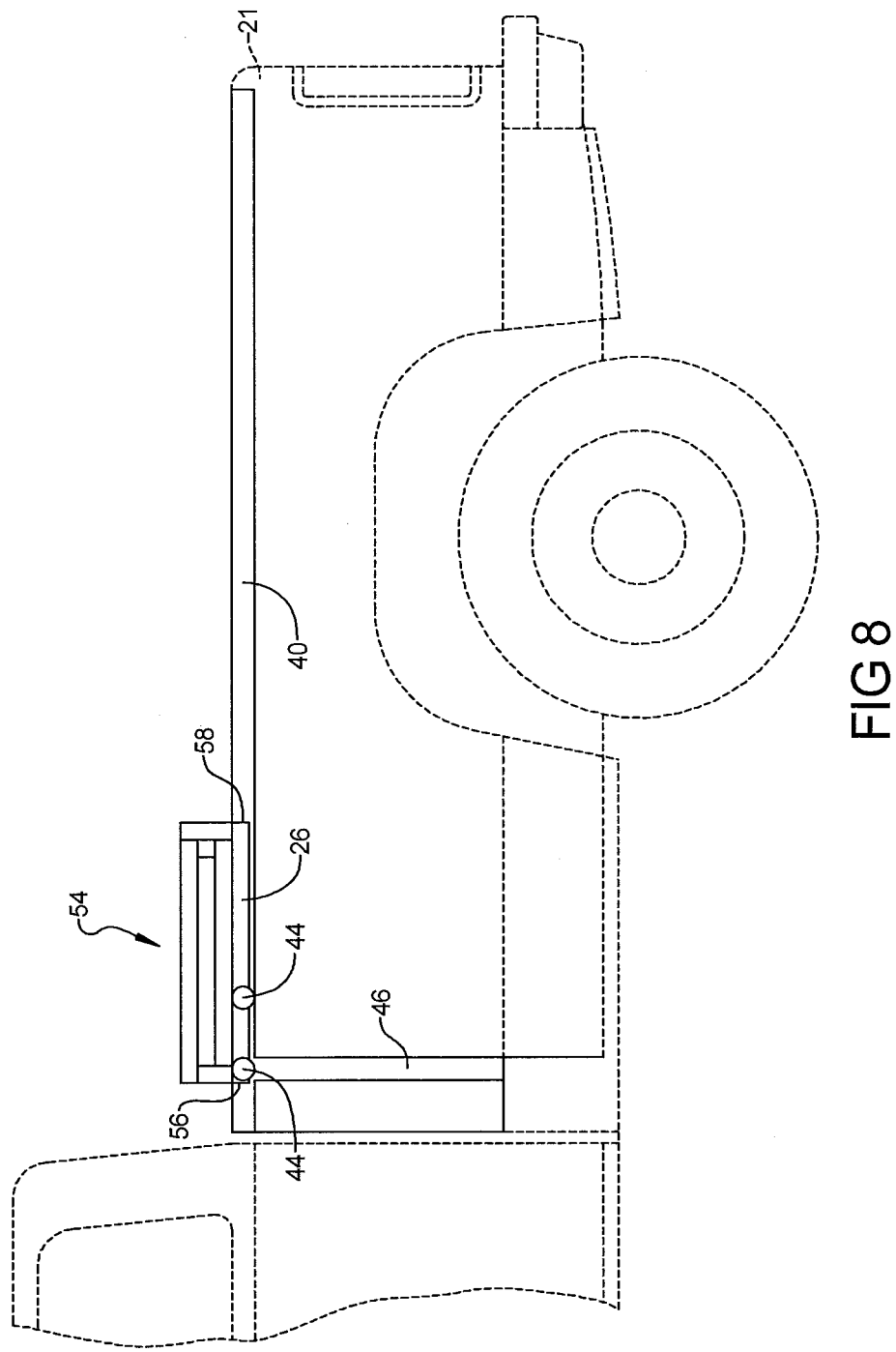
FIG. 8 is a side elevation view of the foldable tonneau cover of FIG. 3 with the stack at an intermediate position.
Figure 9:
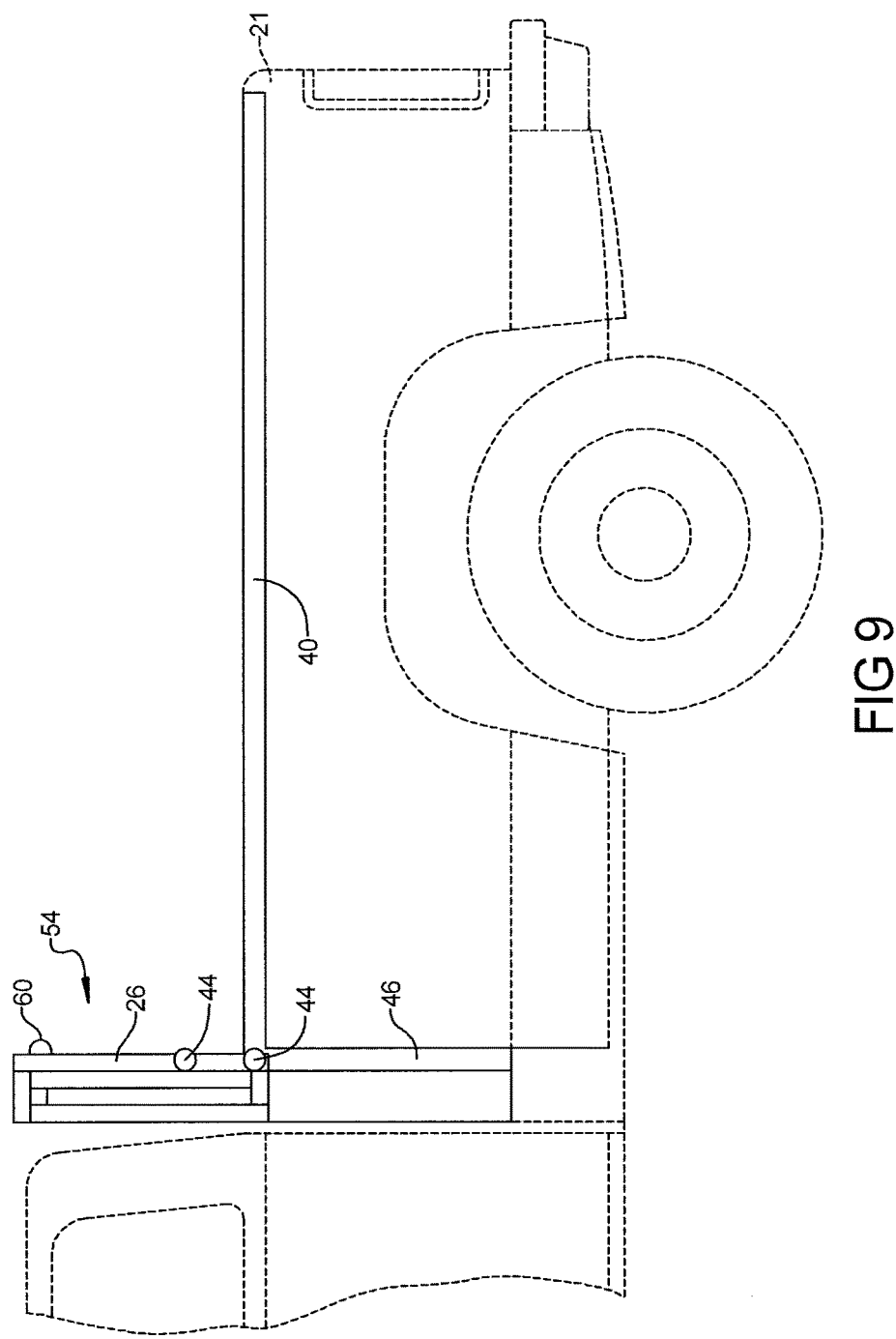
FIG. 9 is a side elevation view of the foldable tonneau cover of FIG. 3 with the stack in a rotated orientation.
Figure 10:
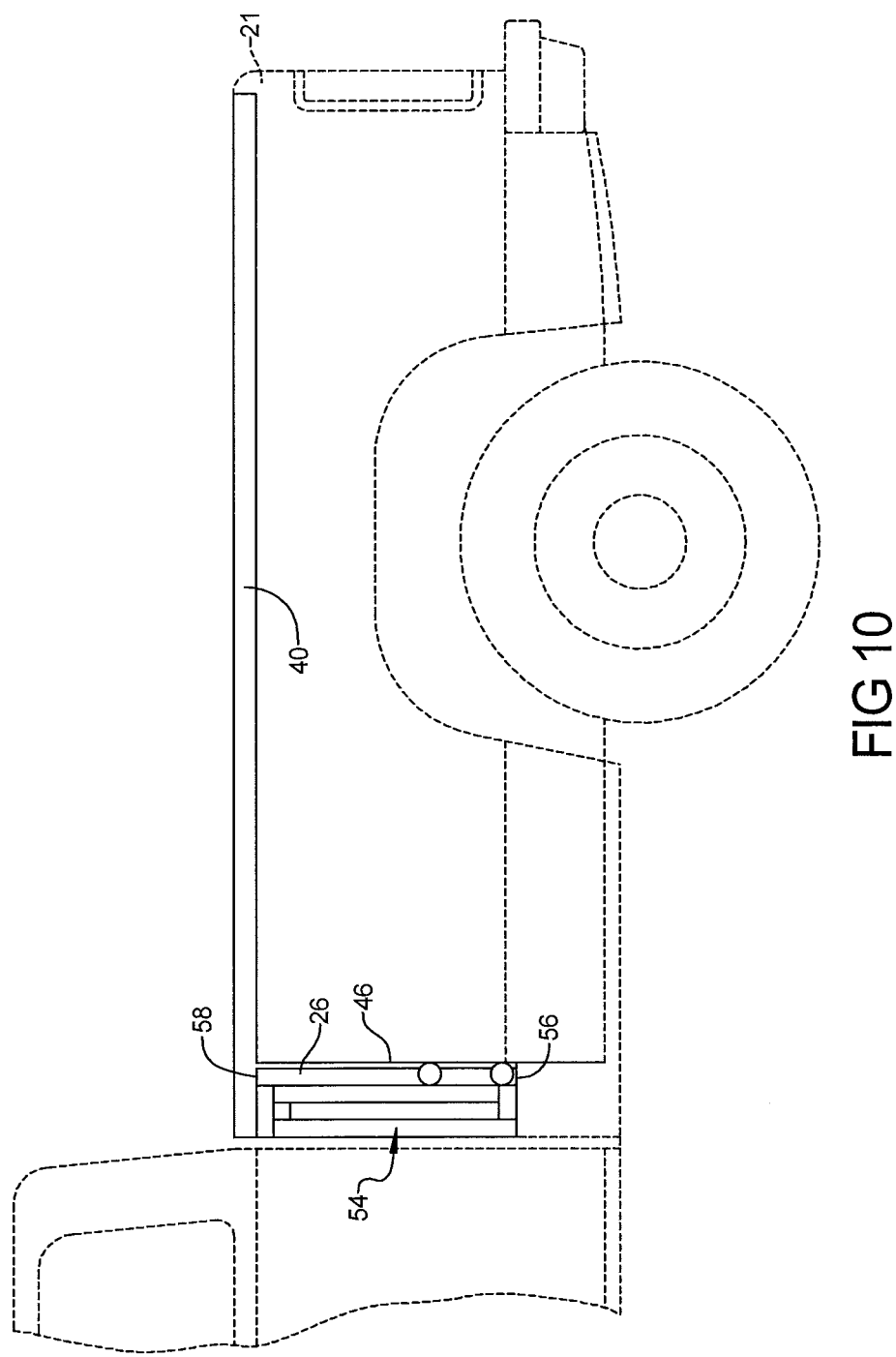
FIG. 10 is a side elevation view of the foldable tonneau cover of FIG. 3 with the stack in a storage position.

As illustrated in FIG. 8, the stack 54 can then be moved along the ledges 42 rearward to an intermediate position where a laterally extending, or forward, edge 56 of the forward panel 26 is adjacent the storage extension guides 46. As illustrated in FIGS. 9 and 10, the stack 54 can be rotated and rolled via the wheels 44 along the guides 46 between the intermediate position (FIG. 8) and a storage position (FIG. 10). The storage extension guides 46 can be mounted to the cargo box 11 to guide the stack 54 so that the stack 54 can be disposed fully within the cargo box 11 in the storage position. The tonneau cover 22 can include a handle, strap, or other grasping member to facilitate this movement.

In some embodiments, when the stack 54 is in the storage position, the forward edge 56 of the forward panel 26 can be oriented below the rear edge 58 of the forward panel 26. In addition, the upper surfaces 36 of the panels 24 can extend substantially coplanar with a first plane in the deployed arrangement (FIG. 3) and the upper surfaces can extend substantially orthogonal to the first plane in the storage position (FIG. 10).

Figure 11:
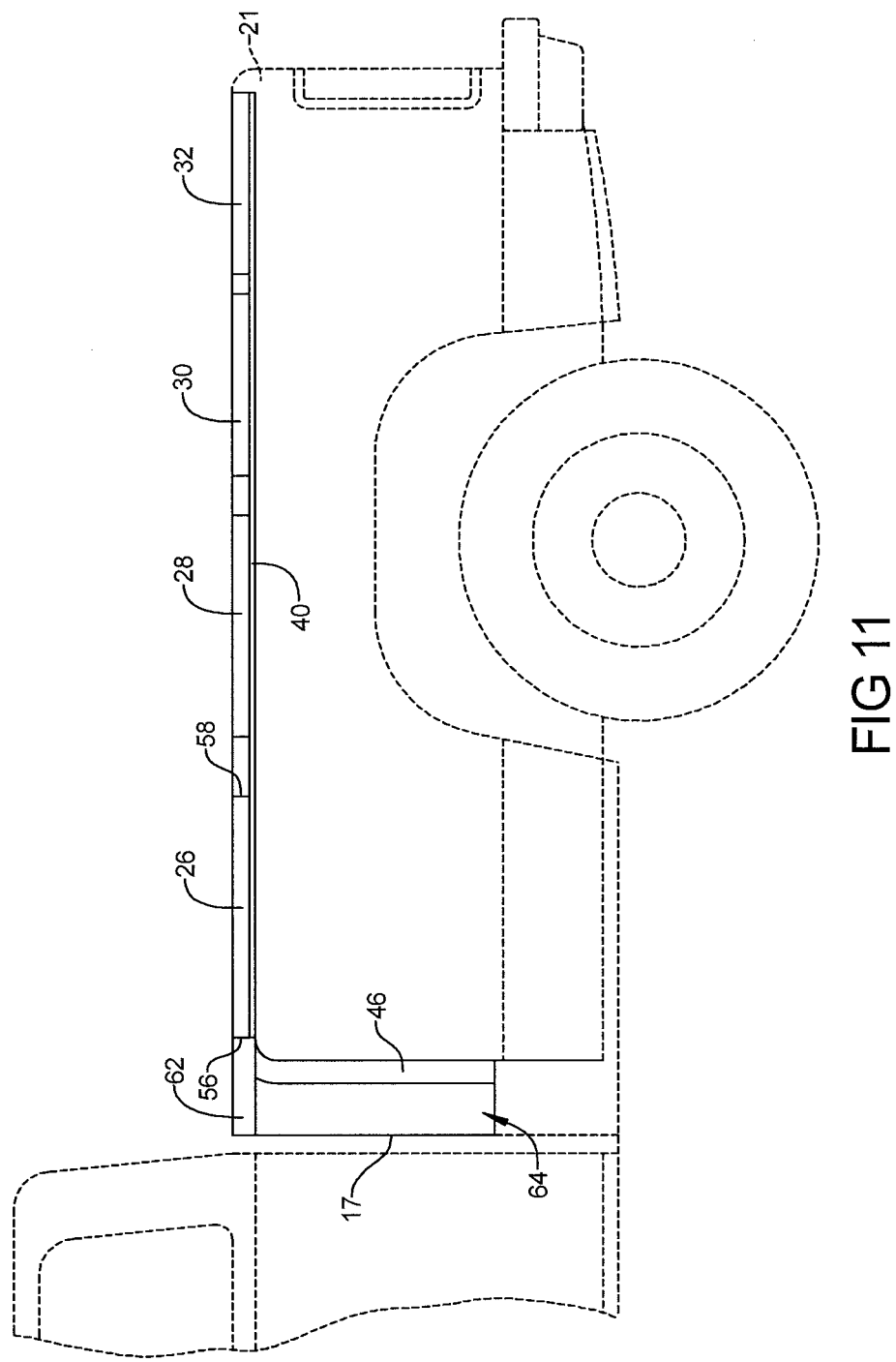
FIG. 11 is a side elevation view of a second exemplary embodiment of a foldable tonneau cover for a truck bed in an extended or unfolded or deployed arrangement covering a cargo box of a pickup truck.
Figure 12:
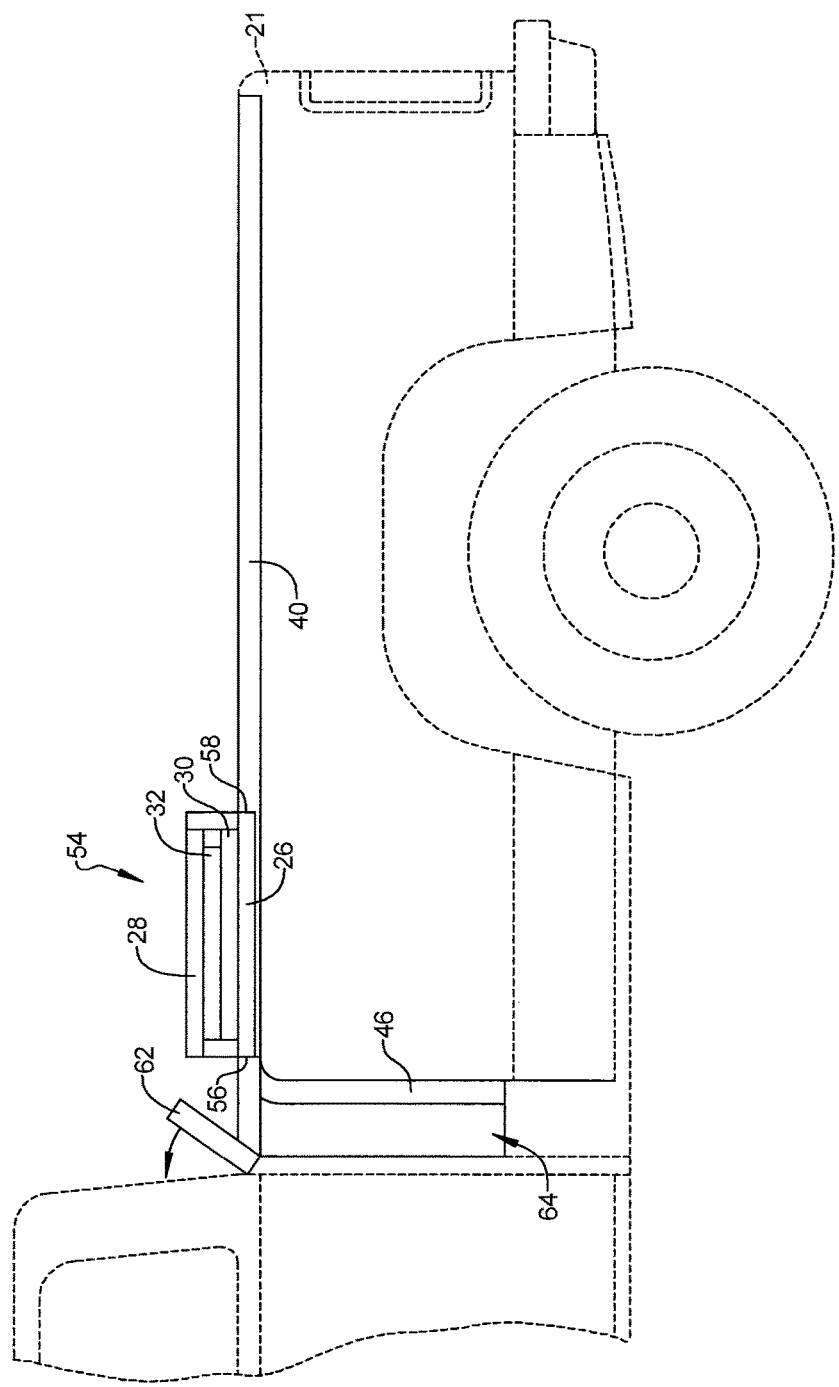
FIG. 12 is a side elevation view of the foldable tonneau cover of FIG. 11 in a stacked arrangement at an initial stack position corresponding to an intermediate position.
Figure 13:
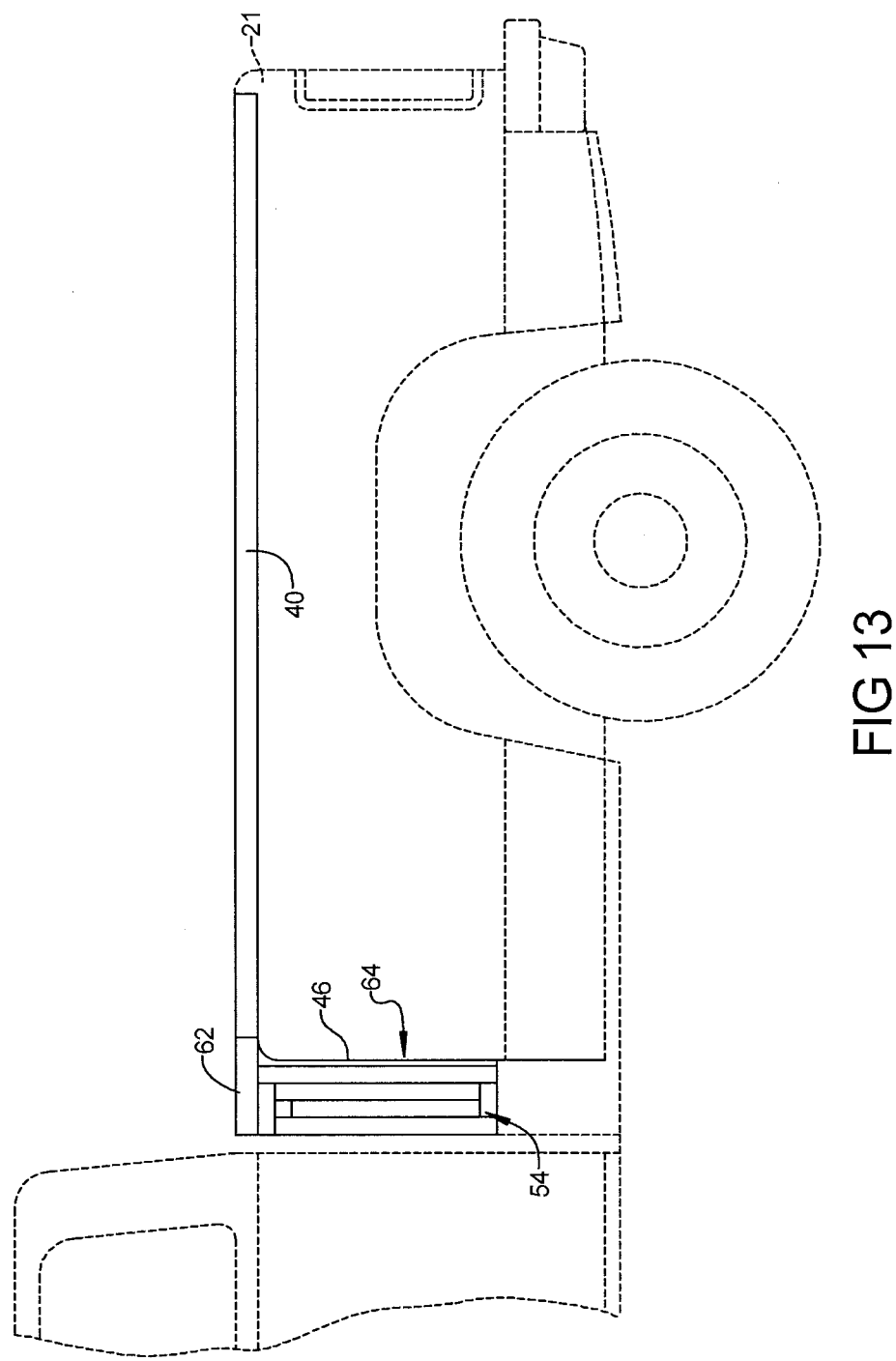
FIG. 13 is a side elevation view of the foldable tonneau cover of FIG. 11 with the stack in a storage position.

FIGS. 11-13 illustrate a second example embodiment. The deployed arrangement (FIG. 11) of the tonneau cover 22 of this embodiment is generally similar to FIG. 3. The forward edge 56 of the forward panel 26, however, is not positioned adjacent the forward wall 17 of the truck box 11. In some embodiments, a separate cover 62 can cover a portion of the cargo box 11 spanning between the forward edge 56 of the forward panel 26 and the forward wall 17 of the truck box 11 in the deployed arrangement.

The separate cover 62 can be hingedly mountable relative to the cargo box 11. For example, the separate cover 62 can be hingedly coupled to a storage box or holder 64 which is, in turn, coupled to the cargo box 11. Alternatively, the separate cover 62 can be hingedly coupled indirectly via another intermediate member, or directly to the cargo box 11.

The panels 24 can be folded into a stack 54 using the process described above. In some embodiments as illustrated in FIG. 12, the initial stack position can correspond to the intermediate position in which the forward edge 56 of the lowermost panel in the stack is adjacent the storage extension guides 46. The second cover can be pivoted from a closed position toward an open position, allowing the stack to pass into the storage position. The stack 54 can slide along the guides 46, or both the ledges 42 and the guides 46 as the stack 54 is pivoted and slid into the storage position (FIG. 13) similar to the process described above. In some embodiments, the side rails 40, the storage guides 46, or both, can have arcuate transitions therebetween.

The second cover 62 can then be pivoted back to the closed position, covering the stack (FIG. 13). The second cover 62, along with the storage extension guides 46 and any storage box or holder 64, can partially or fully enclose and protect the tonneau cover 22 in the storage position. In some embodiments, an assist mechanism, e.g., including gas shocks, (not shown) can be provided to facilitate raising and/or lowering the stack into and out of the storage position.

Figure 14:
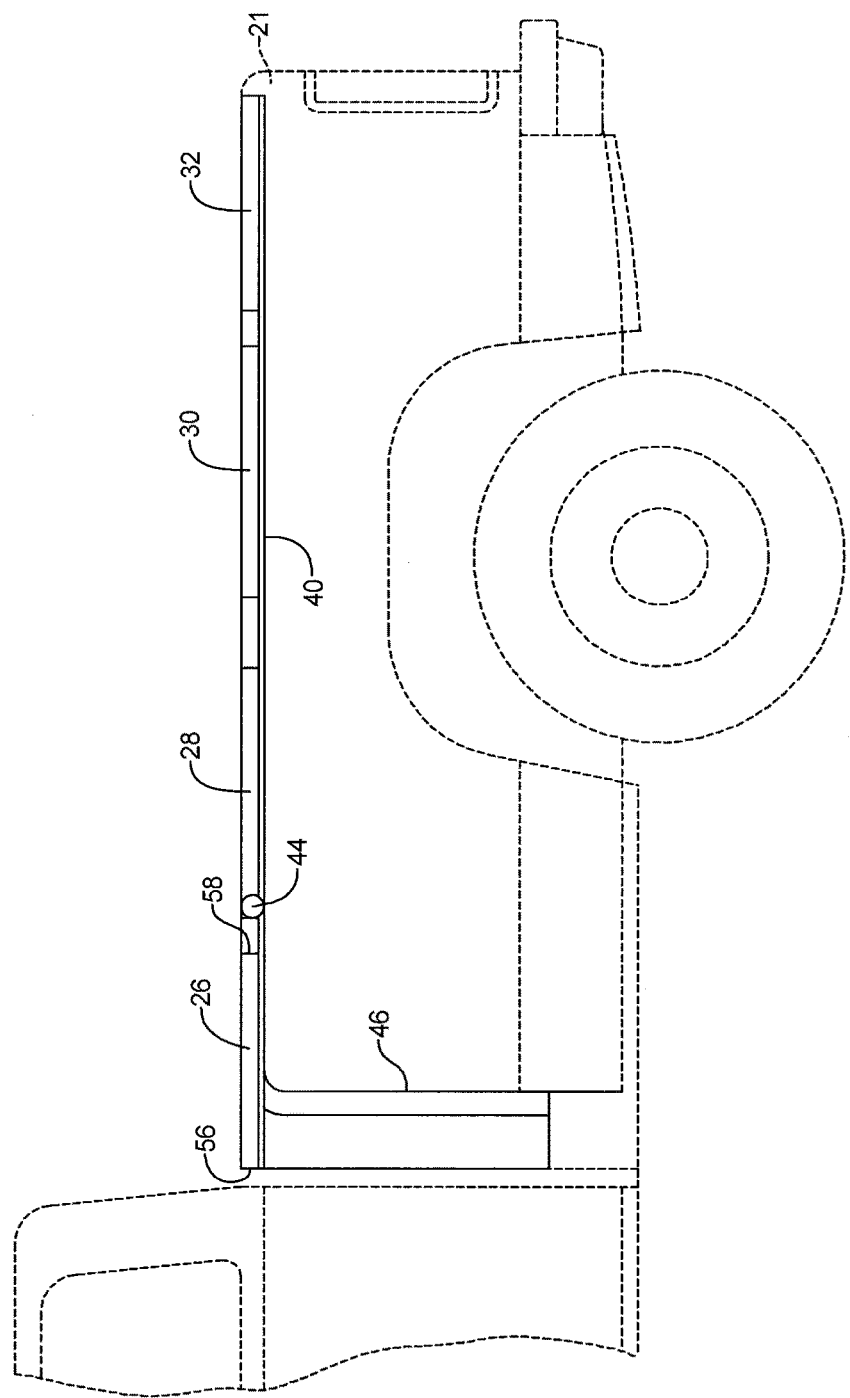
FIG. 14 is a side elevation view of a third exemplary embodiment of a foldable tonneau cover for a truck bed in an extended or unfolded or deployed arrangement covering a cargo box of a pickup truck.
Figure 15:
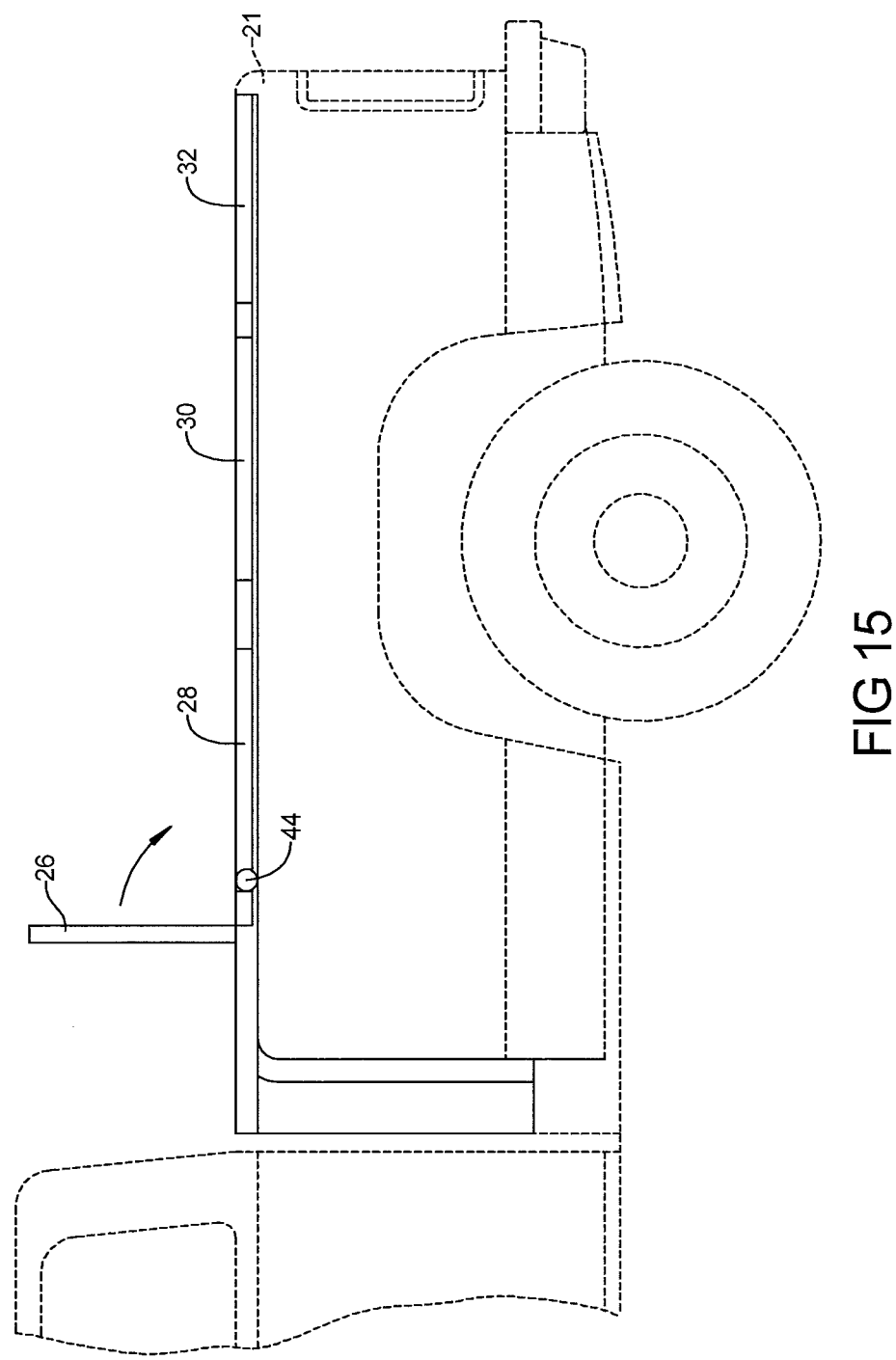
FIG. 15 is a side elevation view of the foldable tonneau cover of FIG. 14 with a forward panel being folded back as the tonneau cover is being folded into the stacked arrangement at an initial stack position.
Figure 16:
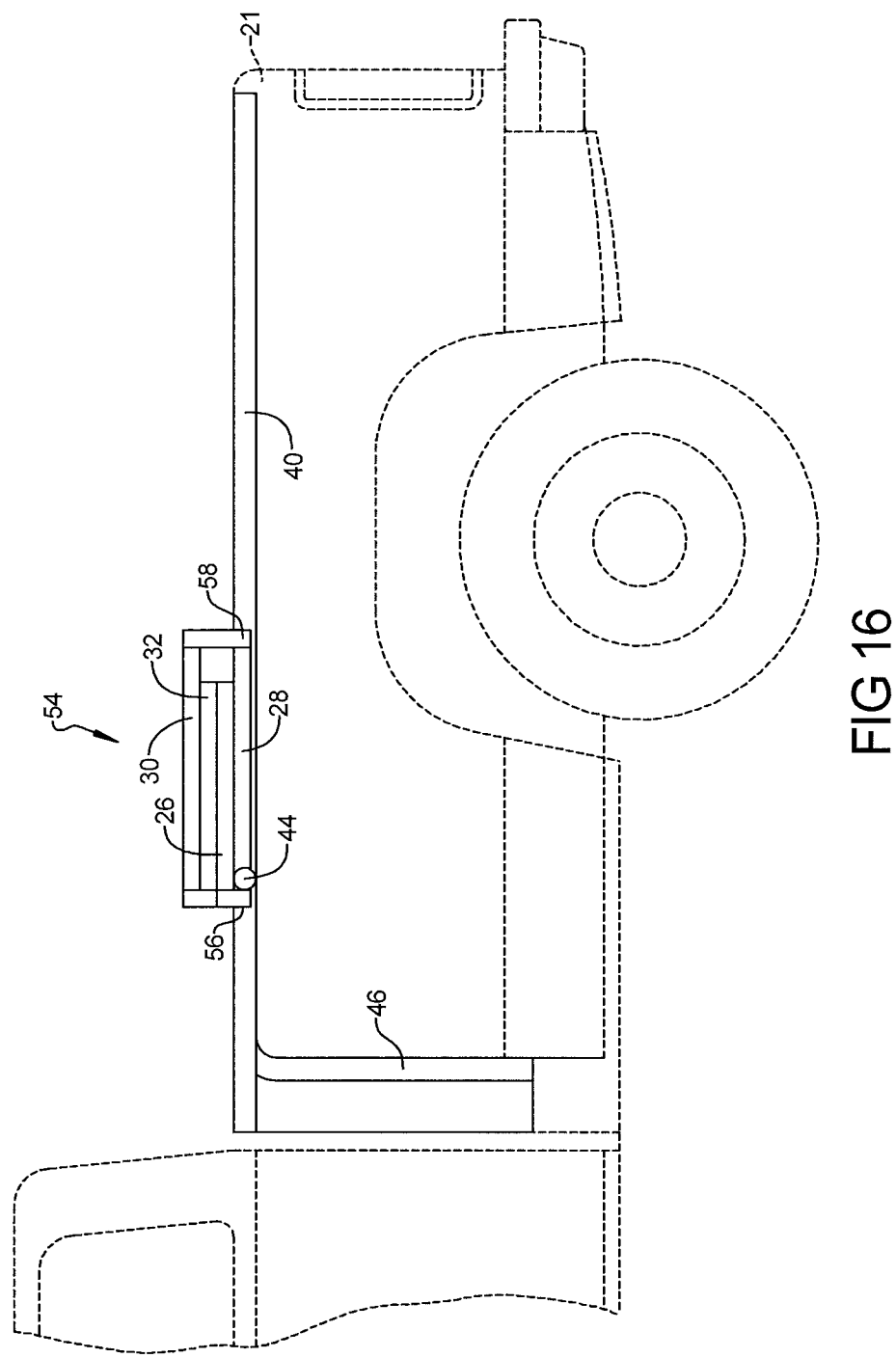
FIG. 16 is a side elevation view of the foldable tonneau cover of FIG. 14 in a stacked arrangement at an initial stack position.

FIGS. 14-16 illustrate a third example embodiment. The deployed arrangement (FIG. 14) of the tonneau cover 22 of this embodiment is generally similar to FIG. 3. The tonneau cover 22 can be folded from the deployed arrangement of FIG. 3 into the stacked arrangement of FIG. 7. For example, the forward panel 26 can be pivoted 180 degrees and folded so the top face 36 of the forward panel 32 can be positioned to oppose or face toward the adjacent top face 36 of the second panel 28. The rear panel 32 can be pivoted 180 degrees and folded so the top face 36 of the rear panel 32 can be positioned to oppose or face toward the adjacent top face 36 of the third panel 30. This rear pair of folded panels 32, 30 can then be pivoted 180 degrees and folded onto the forward pair of folded panels 26, 28 to form a completely folded stack 54. Thus, in some embodiments, the lowermost panel in the stack 54 can be the panel 28 immediately adjacent the forward panel 26, or the second panel. FIG. 16 illustrates the stack 54 in the initial stack position (i.e., the initial position where the formation of the stack 54 is completed) of this embodiment. This initial stack position can also be referred to as the pre-deploy position, since it can also be the position from which the panels 24 are unfolded into the deployed arrangement.

Similar to the process describe above, the stack 54 can be rolled via wheels 44, or can be slid along the ledges 42 of the side rails 40 and along the storage extension guides 46 from an initial stack position through an intermediate position (FIG. 8) and pivoted (FIG. 9) into a storage arrangement (FIG. 10). In the storage arrangement, the lowermost panel in the stack 54 can be the second panel 28, and the second panel 28 can have a forward edge 56 that is lower than its rear edge 58.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a truck comprising:
    a cover comprising a plurality of panels pivotally connected together, the panels being foldable between a stacked arrangement wherein the panels are folded onto a lowermost panel to form a stack and a deployed arrangement wherein the panels are extended over the cargo box with the lowermost panel having a forward edge and a rear edge;
    a first side rail attachable to a first side of the cargo box and comprising a first ledge;
    a first storage extension guide intersecting the first ledge;
    a second side rail attachable to a second side of the cargo box and comprising a second ledge;
    a second storage extension guide intersecting the second ledge;
    wherein the panels are supportable upon the first and second ledges in the deployed arrangement for covering the cargo box; and further
    wherein the stack is supportable upon the first and second ledges in an intermediate position with the forward edge of the lowermost panel adjacent the first and second guides, and the stack is movable along the first and second guides between the intermediate position and a storage position in which the forward edge of the lowermost panel is oriented below the rear edge of the lowermost panel.

2. The tonneau cover system of claim 1, wherein the stack is slidable along the first and second guides between the intermediate position and the storage position.

3. The tonneau cover system of claim 1, wherein the lowermost panel in the stack comprises wheels, and the wheels are rollable along the first and second guides on the wheels between the intermediate position and the storage position.

4. The tonneau cover system of claim 1, wherein the stack is movable along first and second ledges between an initial stack position and the storage position.

5. The tonneau cover system of claim 4, wherein the initial stack position corresponds to the intermediate position.

6. The tonneau cover system of claim 1, wherein the plurality of panels comprise a forward panel and a second panel hingedly coupled to and adjacent the forward panel, wherein the panels are deployed with the forward panel and the adjacent second panel in a forward position in the deployed arrangement, and in the stacked arrangement the lowermost panel is the second panel.

7. The tonneau cover system of claim 6, wherein the stack is movable along first and second ledges between an initial stack position and the storage position.

8. The tonneau cover system of claim 6, further comprising:
    a first wheel affixed to the second panel and extending therefrom for rolling the stack along the first ledge and the first guide; and
    a second wheel affixed to the second panel and extending therefrom for rolling the stack along the second ledge and the second guide;
    wherein the stack is rollable via the wheels along the first and second ledges between an initial stack position and an intermediate position in which the forward edge of the forward panel is adjacent the first and second guides, and the stack is rollable via the wheels along the first and second guides between the intermediate position and a storage position in which the forward edge of the forward panel is oriented below the rear edge of the forward panel.

9. A tonneau cover system for a cargo box of a truck comprising:
 a cover comprising a plurality of panels pivotally connected together, the plurality of panels comprising a forward panel having a forward edge and a rear edge, the panels being foldable between a deployed arrangement wherein the panels are deployed with the forward panel in a forward position, and a stacked arrangement wherein the panels are folded onto the forward panel to form a stack;
 a first side rail attachable to a first side of the cargo box and comprising a first ledge,
 a first storage extension guide intersecting the first ledge;
 a second side rail attachable to a second side of the cargo box and comprising a second ledge,
 a second storage extension guide intersecting the second ledge;
 a first wheel affixed to the forward panel and extending therefrom for rolling the stack along the first guide; and
 a second wheel affixed to the forward panel and extending therefrom for rolling the stack along the second guide;
 wherein the panels in the deployed arrangement are supportable upon the first and second ledges for covering the cargo box; and further
 wherein the stack is rollable via the wheels along the first and second ledges to an intermediate position in which the forward edge of the forward panel is adjacent the first and second guides, and the stack is rollable via the wheels along the first and second guides between the intermediate position and a storage position in which the forward edge of the forward panel is oriented below the rear edge of the forward panel.

10. The tonneau cover system of claim 9, wherein the forward panel has an upper surface that extends substantially along a plane and the first and second wheels rotate about an axis parallel to the plane.

11. The tonneau cover system of claim 9, wherein the first and second wheels have a diameter and the first and second storage extension guides comprise first and second tracks, respectively, each having a width that is greater than the diameter of the wheels.

12. The tonneau cover system of claim 11, wherein the first and second tracks each comprise at least one lip that retains the first and second wheels in the first and second storage extension guides, respectively.

13. The tonneau cover system of claim 9, wherein the first and second wheels are positioned on the first and second ledges and forward the first and second storage extension guides in the deployed arrangement.

14. The tonneau cover system of claim 9, wherein the first and second side rails are mountable to the cargo box to support the stack on the first and second ledges so that the stack extends above the cargo box in the stacked arrangement.

15. The tonneau cover system of claim 9, wherein the first and second storage extension guides are mountable to the cargo box to guide the stack so that the stack is disposed fully within the cargo box in the storage position.

16. The tonneau cover system of claim 9, wherein each of the panels has an upper surface that extends substantially coplanar with a first plane in the deployed arrangement, and wherein the upper surfaces extend substantially orthogonal to the first plane in the storage position.

17. The tonneau cover system of claim 9, wherein the cover assembly further comprises a handle or strap accessible for moving the stack between the storage position and the intermediate position.

18. A tonneau cover system for a cargo box of a truck comprising:
 a tonneau cover comprising a plurality of panels pivotally connected together, the plurality of panels comprising a forward panel having a forward edge and a rear edge, the panels being foldable between a deployed arrangement wherein the panels are deployed with the forward panel in a forward position, and a stacked arrangement wherein the panels are folded onto the forward panel to form a stack;
 a separate cover hingedly mountable relative to the cargo box to cover a portion of the cargo box forward of the forward edge of the forward panel in the deployed arrangement;
 a first side rail attachable to a first side of the cargo box and comprising a first ledge,
 a first storage extension guide intersecting the first ledge;
 a second side rail attachable to a second side of the cargo box and comprising a second ledge,
 a second storage extension guide intersecting the second ledge;
 wherein the panels in the deployed arrangement are supportable upon the first and second ledges for covering the cargo box; and further
 wherein the stack is supportable upon the first and second ledges in an intermediate position in which the forward edge of the forward panel is adjacent the first and second guides and the stack is slidable along the first and second guides between the intermediate position and a storage position in which the forward edge of the forward panel is oriented below the rear edge of the forward panel;
 wherein the second cover is pivotable between an open position allowing the stack to move along the first and second storage extension guides between the intermediate position and the storage position, and a closed position in which the second cover extends over the stack when the stack is in the storage position.

19. The tonneau cover system of claim 18, further comprising at least a portion of a storage box mountable to the cargo box to receive the stack in the storage position.

20. The tonneau cover system of claim 19, wherein the separate cover is hingedly mountable relative to the cargo box by being hingedly coupled to the storage box.

21. The tonneau cover system of claim 18, wherein the first and second side rails are mountable to the cargo box to support the stack on the first and second ledges so that the stack extends above the cargo box in the stacked arrangement.

22. The tonneau cover system of claim 18, wherein the first and second storage extension guides are mountable to the cargo box to guide the stack so that the stack is disposed fully within the cargo box in the storage position.

23. The tonneau cover system of claim 18, wherein each of the panels has an upper surface that extends substantially coplanar with a first plane in the deployed arrangement, and wherein the upper surfaces extend substantially orthogonal to the first plane in the storage position.

24. The tonneau cover system of claim 18, wherein the cover assembly further comprises a handle or strap accessible for moving the stack between the storage position and the intermediate position.

\* \* \* \* \*